Figure 1:
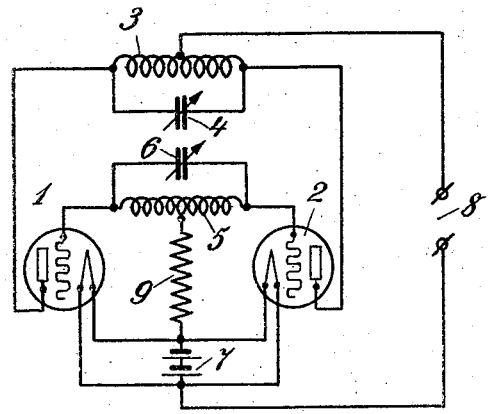

Oct. 11, 1932.    F. GERTH    1,881,472
OSCILLATION SYSTEM
Filed April 14, 1927

Inventor
Felix Gerth.
by
Attorney

Patented Oct. 11, 1932

1,881,472

UNITED STATES PATENT OFFICE

FELIX GERTH, OF BERLIN-TEMPELHOF, GERMANY, ASSIGNOR TO C. LORENZ AKTIENGE-SELLSCHAFT, OF BERLIN-TEMPELHOF, GERMANY

OSCILLATION SYSTEM

Application filed April 14, 1927, Serial No. 183,810, and in Germany April 16, 1926.

The present invention relates to radio transmitters employing three-electrode valves for the generation of short waves.

The object of this invention is an arrangement for generating short waves in which the effect of supply leads on the operating frequency is suppressed or eliminated.

Another object of this invention is an arrangement for generating short waves in which a balanced circuit is supplied to be equivalent to the inherent reactance of the thermionic tubes used and connected in such a way to the supply leads that the electrical constants of these supply leads have no effect on the frequency.

Figure 2:
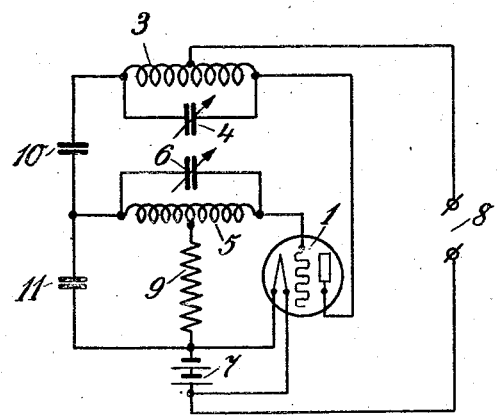

My invention will be further described in detail with reference to the drawing, in which:

Figure 1 shows a conventional system of short wave generator known as a push-pull generator, in which two vacuum tubes are used; and Fig. 2 shows an arrangement of short wave generator according to my invention, wherein the balancing effect of one of the tubes of the push-pull generator is replaced by the balancing effect of two condensers.

In such apparatus it has been found that the leads to the anode and to the grid, which are generally situated in the oscillation circuit, may more particularly in the case of very short waves, substantially determine the frequency of the oscillations. This constitutes a disadvantage since on the one hand, the frequency cannot be always exactly reproduced and on the other hand, it is affected by all kinds of outside disturbances a fact which is a marked drawback in the case of short waves, as the variations of the wave length sent out, which are relatively small in the case of long waves, are liable to produce such fluctuations of the beat note in the receiving apparatus as to render practical working impossible.

A method of connection has been already proposed according to which the leads carry merely the required direct voltage to the anode and to the grid, that is to say do not carry any alternating voltage or current; they cannot therefore affect the frequency of the oscillations generated. This connection is based however on the assumption that two exactly similar thermionic valves are used and is known under the name of push-pull or symmetry connection; such a connection is illustrated in Figure 1 of the accompanying drawing, in which:—

1 and 2 are the two three-electrode oscillation valves, 3 the inductance and 4 the capacity of the anode oscillation circuit arranged between the two anodes and 5 the inductance and 6 the capacity of the grid oscillation circuit arranged between the two grids. 7 is the heating battery, 8 the anode tension battery and 9 a leakage resistance. Owing to the exact symmetry, nodes of the alternating voltage are situated at the centres of the coils to which direct voltage is connected, so that no alternating current flows in the battery and grid wires and the frequency of the oscillations generated is determined solely by the constants of the oscillation circuits.

The object of the present invention is to obtain the same advantages without having to use two valves and to this end, with the use of a single thermionic valve, points of symmetry in the grid and anode circuits to which the sources of direct current may be connected are produced by the employment of balancing impedances corresponding to the inner impedances of the valve.

Figure 2 shows a connection according to the invention with the use of only one valve; it will be seen that the arrangement is similar to that depicted in Figure 1 except that two balancing capacities 10 and 11, which correspond exactly to the values of the internal valve capacities cathode-grid or grid-anode, are substituted for the valve 1, so that the perfect symmetry existing in the circuit shown in Figure 1 is retained.

In most cases the symmetry will still be sufficient even if the balancing capacity corresponding to the grid-cathode capacity is omitted. The balancing by the two capacities 10 and 11 does not, at first sight, appear complete, as the ohmic resistances of the valve, which may be assumed to be arranged parallel to the section cathode-grid or grid-anode, are not balanced, but this is immaterial in the case of short waves as the ohmic resistance is very small relatively to the reactance (in the present case capacity impedance) with short wave length. The capacities have the further function of preventing a direct current of the high voltage battery 8 flowing through any other circuit except through the tube 1 itself. Thus the leads from the high tension battery A are prevented from forming part of the high frequency or oscillatory circuits and, accordingly, from exerting an influence on the natural oscillation constants.

What I wish to be secured by Letters Patent in the United States is:

1. In a vacuum tube oscillation circuit, comprising a single vacuum tube, having cathode, anode and control electrodes, an oscillatory circuit connected between said cathode and said anode, a control circuit connected between said control electrode and said cathode, a grid leak resistance placed between a symmetry point of said control circuit and said cathode and high tension supply leads for said tube connected to said cathode, and a symmetry point of said oscillatory circuit.

2. In a discharge tube oscillation circuit, comprising a single discharge tube, having cathode anode and a control electrode, an oscillatory circuit directly connected to said anode and capacitatively connected to said cathode, a control circuit directly connected to said control electrode and capacitatively connected to said cathode, a grid leak resistance placed between a symmetry point of said control circuit and said cathode and high tension supply leads for said tube, connected to said cathode and a symmetry point of said oscillatory circuit.

3. In a vacuum tube oscillation circuit, comprising a single vacuum tube, having cathode, anode and a control electrode, an oscillatory circuit, consisting of an inductance coil and a condenser in parallel, directly connected to said anode and capacitatively connected to said cathode, a control oscillatory circuit, also consisting of an inductance coil and a condenser in parallel and directly connected to said control electrode and capacitatively connected to said cathode, a grid leak resistance connected between a mid-tap point of said second inductance coil and said cathode and high tension supply leads to said tube, connected to said cathode and a mid-tap point of said first inductance coil.

4. In a vacuum tube oscillation circuit, comprising a single vacuum tube, having cathode, anode and a control electrode, a pair of condensers connected in series, an output oscillatory circuit, connected to said anode and to the free terminal of one of said condensers, a controlling oscillatory circuit, connected to said control electrode and the common connecting terminal of said condensers, a grid leak resistance placed between a symmetry point of said control circuit on the one hand and the remaining free terminal of said condensers and said cathode on the other hand, and high tension supply leads for said tube connected to said cathode and a symmetry point of said output oscillatory circuit.

5. In a vacuum tube oscillation circuit, comprising a single vacuum tube, having cathode, anode and control electrodes, a pair of condensers connected in series, an output oscillatory circuit, consisting of an inductance coil and a condenser in parallel and connected to said anode and the free terminal of one of said condensers, a controlling oscillatory circuit, also consisting of an inductance coil and a condenser in parallel and connected to said control electrode and the common connecting terminal of said condensers, a grid leak resistance placed between a mid-tap point of said second inductance coil, on the one hand and said cathode and the remaining free terminal of said condensers, on the other hand, and high tension supply leads for the tube connected to said cathode and a mid-tap point of said first inductance coil.

6. An oscillating circuit comprising a vacuum tube having cathode, anode, and grid electrodes; a pair of condensers, one of said condensers having a capacity corresponding to the inherent cathode-grid capacity of said tube, and the other of said condensers having a capacity corresponding to the inherent grid-anode capacity of said tube, said condensers being connected in series to form an equivalent capacity system to the inherent capacity system of said tube; connections from said cathode, grid, and anode to corresponding points of said equivalent capacity system; and a pair of oscillatory circuits inserted respectively in said connections from said anode and from said grid to corresponding points on said capacity system.

In testimony whereof I have affixed my signature.

FELIX GERTH.